United States Patent [19]

Nishikawa et al.

[11] Patent Number: 5,124,529
[45] Date of Patent: Jun. 23, 1992

[54] FLUX-CORED WIRE FOR WELDING STAINLESS STEEL

[75] Inventors: Yutaka Nishikawa; Tsuneshi Ogawa, both of Fujisawa; Ken Yamashita, Yokohama; Haruya Kozuki, Fujisawa, all of Japan

[73] Assignee: Kabushiki Kaisha Kobe Seiko Sho, Kobe, Japan

[21] Appl. No.: 658,871

[22] Filed: Feb. 22, 1991

[30] Foreign Application Priority Data

Feb. 22, 1990 [JP] Japan .................................. 2-41523

[51] Int. Cl.$^5$ .............................................. B23K 35/22
[52] U.S. Cl. ................................................. 219/146.22
[58] Field of Search .................. 219/146.22, 146.31, 219/146.41, 145.22

[56] References Cited

U.S. PATENT DOCUMENTS

| | | | |
|---|---|---|---|
| 3,919,519 | 11/1975 | Petersen | 219/146.22 |
| 4,245,145 | 1/1981 | Maniar et al. | 219/146.41 |
| 4,436,554 | 3/1984 | Omae et al. | 219/146.41 |

*Primary Examiner*—Clifford C. Shaw
*Attorney, Agent, or Firm*—Oblon, Spivak, McClelland, Maier & Neustadt

[57] ABSTRACT

A flux-cored wire for welding stainless steel, with the flux filled in the metal skin, which contains 5-30% (by weight) of flux, 10.5-27.0% of Cr, less than 2% of slag-forming constituents, 0.05-2.0% of Ti, 0.05-2.0% of Si, 0.01-0.1% of N, 0.01-1.0% of Al, 0.1-1.0% of Mn, and 0.003-0.5% of metal fluorides constituting the flux, in the total weight of the wire. The wire may optionally contain Ni, alkali metals, S, Nb, Zr, and V. The wire gives rise to only a small amount of slag.

5 Claims, 1 Drawing Sheet

FIG. I(A)
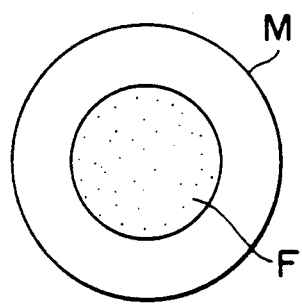
FIG. I(B)
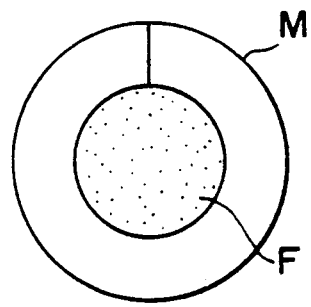
FIG. I(C)
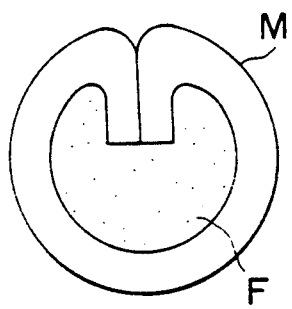
FIG. I(D)
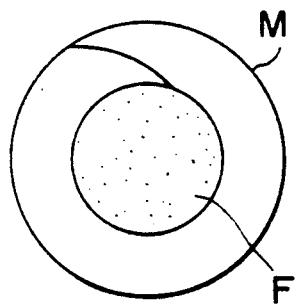

FLUX-CORED WIRE FOR WELDING STAINLESS STEEL

BACKGROUND OF THE INVENTION

1. Field of the Invention

The present invention relates to a flux-cored wire for welding stainless steel. More particularly, it is concerned with a flux-cored wire for welding stainless steel which gives rise to a very small amount of slag and permits easy welding operations.

2. Description of the Prior Art

Recent years have seen the applications of stainless steel in a large variety of fields where sophistication and high performance are required. An example of such applications is the use of stainless steel for automotive exhaust systems. In this application area, stainless steel is welded with solid wires or flux-cored wires.

Conventional solid wires and flux-cored wires, however, have many disadvantages mentioned below.

Solid wires have to be used under strictly controlled welding conditions although they give rise to a less amount of slag than flux-cored wires. In addition, they often cause burn through in the welding of thin plates such as those used for the automotive exhaust system, and this reduces the efficiency of welding operations.

On the other hand, flux-cored wires can used under more moderate conditions than solid wires and scarcely cause burn through in the welding of thin plates. Nevertheless, they give rise to a large amount of slug which fall out afterward, causing noise or clogging. This prevents flux-cored wires from being applied to the welding of pipe inside.

There has been a demand for a new welding wire for stainless steel which gives rise to as small an amount of slug as conventional solid wires and yet can be used under moderate conditions like conventional solid wires with a minimum of liability to burn through.

SUMMARY OF THE INVENTION

The present invention was completed to meet this demand. Accordingly, it is an object of the present invention to provide a welding material for stainless steel which has the advantages of both solid wires and flux-cored wires. The welding material gives rise to only a small amount of slag and is very easy to use in welding operations.

With the above-foregoing in mind, the present inventors carried out extensive studies on how to make best use of the advantage of a flux-cored wire while eliminating its disadvantage—a large amount of slag. As the result, it was found that the object is achieved if the flux-cored wire is incorporated with (1) a limited amount of slag-forming constituents based on the total weight of wire, for the reduction of slag, (2) metallic titanium or a titanium compound as the arc stabilizer, (3) a metal fluoride for the improvement of arc concentration, and (4) metallic silicon or a silicon compound for the reduction of spatters.

It was also found that the flux-cored wire may be incorporated with metallic aluminum or an aluminum alloy to compensate for the partial loss of welding performance resulting from limiting the content of the slag-forming constituents.

It addition, it was found that the flux-cored wire may be incorporated with metallic niobium or a niobium alloy, metallic zirconium or a zirconium alloy, or metallic vanadium or a vanadium alloy, alone or in combination, to prevent slag (which might occur in a very small amount) from falling out.

Moreover, it was found that the flux-cored wire may be incorporated with an alkali metal (for the improvement of arc concentration in welding with a low electric current) and sulfur as a simple substance or a sulfur compound (for the reduction of spatters).

The above-mentioned findings, together with the results of experiments on the adequate amount of each component and the adequate flux-to-wire ratio, led to the present invention.

The present invention is embodied in a flux-cored wire for welding stainless steel, with the flux filled in the metal skin, which contains 5–30% (by weight) of flux, 10.5–27.0% of Cr, less than 2% of slag-forming constituents (other components than metal powder in the flux), 0.05–2.0% of Ti (or Ti component in the case of Ti compound), 0.05–2.0% of Si (or Si component in the case of Si compound), 0.01–0.1% of N (or N component in the case of metal nitride), 0.01–1.0% of Al (or Al component in the case of Al alloy), 0.1–1.0% of Mn (or Mn component in the case of Mn compound), and 0.003–0.5% of metal fluorides (in terms of fluorine) constituting the flux, in the total weight of the wire. The wire may contain up to 25% of Ni.

The flux-cored wire may additionally contain 0.002–0.3% of alkali metals constituting the flux, in the total weight of the wire.

The flux-cored wire may additionally contain 0.01–0.07% of S (or S component in the case of S compound), in the total weight of the wire.

The flux-cored wire may additionally contain 0.01–2.0% in total of Nb (or Nb component in the case of Nb alloy), Zr (or Zr component in the case of Zr alloy), and V (or V component in the case of V alloy), alone or in combination, in the total weight of the wire.

BRIEF DESCRIPTION OF THE DRAWINGS

FIGS. 1a–1d show cross sections of some examples of the flux-cored wires. M and F denote the metal skin and flux, respectively.

DESCRIPTION OF THE PREFERRED EMBODIMENTS

The invention will be described in more detail in the following.

In order to reduce the amount of slag resulting from a flux-cored wire, it is necessary to reduce the slag source in the wire. However, this is not achieved simply by filling the metal skin with a flux consisting solely of alloy elements required, or a flux excluding the slag-forming constituents used in the conventional flux-cored wire. The resulting flux-cored wire would not be as good as the conventional flux-cored wire in welding performance.

To address this problem, the present inventors studied the effects of various oxides, nitrides, fluorides, and metal powders. As the results, they succeeded in the development of a new flux-cored wire for welding stainless steel which gives rise to a very small amount of slag, permitting easy welding operations.

According to the present invention, the flux-cored wire contains each component in a limited amount for reasons given below.

Amount of Flux

The flux-cored wire of the present invention has a flux filled in the metal skin. With an amount of flux less than 5% of the total weight of the wire, the cylindrical core space formed by the metal skin will have voids which prevent the uniform distribution of the flux. With an amount of flux in excess of 30%, the metal skin would be too thin to provide the wire strength required. Therefore, the amount of flux should be 5-30%, preferably 10-27%.

Content of Cr in Wire

The content of Cr in the wire should be 10.5-27.0% so that the weld metal has the same corrosion resistance and oxidation resistance as the base metal.

Content Of Ni In Wire

The content of Ni (as an optional component) in the wire should be up to 25% so that the weld metal has the same corrosion resistance and oxidation resistance as the base metal.

Total Amount of Slag-Forming Constituents

As mentioned above, reducing the amount of slag-forming constituents in the wire is essential for the reduction of slag. A flux-cored wire containing slag-forming constituents in excess of 2% in total would be difficult to handle. Therefore, the total amount of slag-forming constituents should be less than 2%. The slag-forming constituents are those components other than metal powder in the flux. They include, for example, oxides such as $TiO_2$, $SiO_2$, $Na_2O$, $K_2O$, CaO, $Al_2O_3$, $Li_2O$, MnO, and MgO, and fluorides such as LiF, NaF, $CaF_2$, KF, and $AlF_2$.

Content Of Ti In Wire

Since Ti ionizes (or releases electrons) more readily than other elements in the wire, it stabilizes the arc current and permits smooth movement of droplets. With a content less than 0.05% of the total weight of the wire, it does not produce any marked effect. With a content in excess of 2%, it increases the amount of slag. Therefore, the content of Ti should be 0.05-2.0%, preferably 0.1-1.0%, of the total weight of the wire.

Ti is incorporated into either or both of the metal skin and flux. Ti incorporated into the flux may be in the form of Ti alloy such as Fe-Ti and Ni-Ti or Ti compound such as nitride (TiN) and carbide (TiC). The amount of Ti alloy or compound is expressed in terms of Ti.

Content of Si in Wire

Ti added in an amount of 0.05-2.0% of the total weight of the wire stabilizes arcs, as mentioned above; however, on the other hand, it gives rise to more spatters. This disadvantage is eliminated by adding Si to the wire.

Si divides droplets into fine particles and hence reduces the amount of spatters when used in combination with Ti. With an amount less than 0.05% of the total weight of the wire, Si does not produce its effect. With an amount in excess of 2.0%, Si rather increases the amount of spatters. Therefore, the content of Si should be 0.05-2.0%, preferably 0.2-1.2%, of the total weight of the wire.

Si is incorporated into either or both of the metal skin and flux. Si incorporated into the flux may be in the form of metallic Si or an Si alloy (or compound) such as Fe-Si, Al-Si, and Ni-Si. The amount of Si alloy (or compound) is expressed in terms of Si.

Content of N in Wire

N reduces the size of droplets and the amount of spatters; therefore, it compensates for the partial loss of welding performance (especially increased spatters) resulting from the reduction of slag-forming constituents in the wire. With an amount less than 0.01% of the total weight of the wire, N does not produce its marked effect. With an amount in excess of 0.1%, N makes arcs unstable, giving rise to more spatters. Therefore, the content of N should be 0.01-0.1% of the total weight of the wire.

N is incorporated into either or both of the metal skin and flux. N incorporated into the flux may be in the form of metal nitride such as Ti-N, N-Cr, and Mn-N. The amount of metal nitride is expressed in terms of N.

Content of Al in Wire

Al helps form droplets rapidly, thereby compensating for the partial loss of welding performance, especially unstable arcs, which results from the reduction of slag-forming constituents in the wire. With an amount less than 0.01% of the total weight of the wire, Al does not produce its marked effect. With an amount in excess of 1.0%, Al makes it difficult for droplets to release themselves from the wire tip, which leads to the generation of large spatters. Therefore, the content of Al should be 0.01-1.0% of the total weight of the wire.

Al is incorporated into either or both of the metal skin and flux. Al incorporated into the flux may be in the form of metallic Al or an Al alloy such as Fe-Al and Al-Mg. The amount of Al alloy is expressed in terms of Al.

Content of Metal Fluorides in Flux

Fluorine takes up an electron in the arc, making itself a stable monovalent anion. Therefore, it stabilizes and concentrates the arcs. This effect is salient when the total amount of metal fluorides in the flux exceeds 0.003% in terms of F. However, with an amount more than 0.5%, metal fluorides destabilize the arcs and increase the amount of spatters. Therefore, the content of metal fluorides (in terms of F) in the flux should be 0.003-0.5%, preferably 0.01-0.2%, of the total weight of the wire. Examples of the metal fluorides include LiF, NaF, $BaF_2$, $CaF_2$, and $AlF_3$.

Content of Mn in Wire

Mn functions as a deoxidizer and improves the ductility and toughness of weld metal. However, Mn in an excess amount deteriorates the ductility and toughness of wed metal, because Mn is an element to form austenite and hence helps form the martensitic structure. Therefore, the content of Mn should be 0.1-1.0% of the total weight of the wire.

Mn is incorporated into either or both of the metal skin and flux. Mn incorporated into the flux may be in the form of metallic Mn or an Mn alloy (such as Fe-Mn, Fe-Si-Mn, and Mn-N) or an Mn compound (such as nitride). The amount of Mn alloy (or compound) is expressed in terms of Mn.

Content of Alkali Metal in Flux

An alkali metal may be added according to need. It becomes easily ionized and hence improves the arc concentration in welding with a low electric current and decreases the amount of spatters. For the desired effect, it should be added in an amount more than 0.002% of the total weight of the wire. However, with an amount in excess of 0.3%, it destabilizes arcs and increases the amount of spatters. Therefore, the content of an alkali metal in the flux should be 0.002-0.3%, preferably 0.01-0.3%, of the total weight of the wire.

The alkali metal may be added in the form of simple substance, oxide (such as $Li_2O$, $Na_2O$, and $K_2O$), carbonate (such as $Li_2CO_3$), fluoride (such as NaF and $K_2SiF_6$), and alloy (such as Li ferrite). The alkali metal compound or alloy should be added in an amount of 0.002-0.3%, preferably 0.005-0.2%, in terms of alkali metal.

Content of S in Wire

S may be added according to need. It divides droplets into fine particles in welding with a low electric current and promotes the uniform movement of droplets. With an amount less than 0.01% of the total weight of the wire, S does not produce its marked effect. With an amount in excess of 0.07%, S is liable to cause hot cracking. Therefore, the content of S should be 0.01-0.07% of the total weight of the wire.

S is incorporated into either or both of the metal skin and flux. S incorporated into the flux may be in the form of simple substance or an S compound such as Fe-S and Cu-S. The amount of S compound is expressed in terms of S.

Content Of Nb, Zr, and V in Wire

It is difficult to completely suppress the formation of slag, because the metal constituting the wire and the metal powder in the flux contain oxygen in the form of oxide film. The results of investigations by the present inventors revealed that Nb, Zr, and V keep slag in position and prevent slag from peeling off. They may be used optionally alone or in combination with one another.

With a total amount of Nb, Zr, and V less than 0.01% of the total weight of the wire, they do not produce any marked effect. With a total amount of Nb, Zr, and V in excess of 2.0%, they destabilize the arc and greatly increase the amount of spatters, thereby making welding operation difficult. Therefore, the total content of Nb, Zr, and V should be 0.01-2.0%, preferably 0.01-1.5%, of the total weight of the wire.

Nb, Zr, and V are incorporated into either or both of the metal skin and flux. Nb, Zr, and V incorporated into the flux may be in the form of metal or alloys (such as Fe-Nb, Fe-Zr, and Fe-V). The amount of the alloys is expressed in terms of their respective metals.

The above-mentioned flux-cored wire may have a variety of sectional structures as shown in FIG. 1. There are no specific restrictions on the wire diameter, and the flux-cored wire may be used for welding stainless steels of various compositions.

EXAMPLES

The invention will be described in more detail with reference to the following example.

Samples of flux-cored wires, having a diameter of 1.2 mm and a sectional structure as shown in FIG. 1(D), were prepared. They differ in the chemical composition of the metal skin as shown in Table 1 and also in the chemical composition and amount of the flux as shown in Table 3.

The samples were tested under the welding conditions as shown in Table 2 for the stability of arcs they produce and the amount of spatters and slag they give rise to. The results are shown in Table 3. The arc stability is rated as excellent, good, poor, and bad. The amount of spatters is rated as excellent (less than 2 g in 1 minute), good (less than 3 g in 1 minute), and bad (more than 3 g in 1 minute). The amount of slag is rated as good (less than 400 mg) and bad (more than 400 mg) for a 300-mm long bead on a 6-mm thick mild steel plate.

TABLE 1

| Symbol | Chemical Composition of Metal Skin (wt %) | | | | | | | | | | |
| --- | --- | --- | --- | --- | --- | --- | --- | --- | --- | --- | --- |
| | C | Si | Mn | P | S | Ni | Cr | Ti | Al | N | Fe |
| a | 0.024 | 0.02 | 0.19 | 0.016 | 0.008 | <0.01 | <0.01 | <0.01 | <0.005 | 0.004 | Balance |
| b | 0.015 | 0.47 | 0.41 | 0.018 | 0.003 | <0.01 | 13.5 | 0.30 | 0.20 | 0.005 | Balance |
| c | 0.008 | 0.66 | 0.98 | 0.025 | 0.002 | 11.05 | 18.12 | <0.01 | <0.005 | 0.002 | Balance |

TABLE 2

| Welding Conditions | | | | | |
| --- | --- | --- | --- | --- | --- |
| Current (A) | Voltage (V) | Welding rate (cm/min) | Polarity | Shielding gas | Tip-base metal distance (mm) |
| 200 | 20 | 60 | DCEP | 80% Ar + 20% $CO_2$ (flow rate 15 L/min) | 15 | other.

TABLE 3

| Chemical Composition of Wire Samples | | | | | | | | | | | | | | | | | |
| --- | --- | --- | --- | --- | --- | --- | --- | --- | --- | --- | --- | --- | --- | --- | --- | --- | --- |
| Sample | Si | Mn | Ni | Cr | Ti | Al | N | $Al_2O_3$ | MgO | $SiO_2$ | $Li_2O$ | $Na_2O$ | $K_2O$ | $Li_2O_3$ | $Li_2CO_3$ | $BaF_2$ | $CaF_2$ | LiF |
| 1 | 0.68 | 0.20 | — | 17.30 | 0.55 | 0.12 | 0.04 | 0.25 | — | 0.18 | — | — | — | — | — | 0.42 | — | — |
| 2 | 0.75 | 0.84 | 8.84 | 21.53 | 0.48 | 0.06 | 0.03 | — | 0.16 | 0.08 | — | — | — | — | — | — | 0.25 | — |
| 3 | 0.80 | 0.25 | — | 17.50 | 0.50 | 0.10 | 0.03 | 0.06 | 0.06 | — | — | — | — | — | 0.02 | — | — | — |
| 4 | 1.20 | 0.23 | — | 17.60 | 0.08 | 0.03 | 0.02 | — | 0.04 | 0.02 | — | — | — | — | — | 0.21 | — | — |
| 5 | 0.06 | 0.21 | — | 17.60 | 1.70 | 0.40 | 0.08 | 0.07 | 0.01 | 0.01 | — | — | — | — | — | — | 0.25 | — |
| 6 | 1.00 | 0.19 | — | 17.80 | 0.25 | 0.05 | 0.05 | 0.22 | — | — | 0.05 | — | 0.16 | — | — | — | — | 0.10 |
| 7 | 0.60 | 0.28 | — | 17.45 | 0.35 | 0.33 | 0.02 | — | 0.03 | — | — | 0.02 | — | — | — | — | — | — |
| 8 | 0.68 | 0.82 | 11.80 | 20.00 | 0.13 | 0.08 | 0.08 | 0.03 | — | 0.03 | — | — | — | — | — | — | — | — |
| 9 | 1.20 | 0.84 | 11.75 | 19.80 | 0.70 | 0.08 | 0.08 | — | 0.01 | — | — | — | — | — | — | — | — | — |
| 10 | 0.50 | 0.41 | — | 18.10 | 0.50 | 0.25 | 0.03 | 0.02 | 0.02 | 0.01 | — | — | — | — | — | — | — | 0.01 |

TABLE 3-continued

Chemical Composition of Wire Samples

| | | | | | | | | | | | | | | | | | |
|---|---|---|---|---|---|---|---|---|---|---|---|---|---|---|---|---|---|
| 11 | 0.52 | 0.39 | — | 17.90 | 0.37 | 0.23 | 0.03 | — | 0.03 | — | — | — | — | — | — | — | 0.02 |
| 12 | 0.55 | 0.38 | — | 17.95 | 0.41 | 0.21 | 0.05 | — | — | 0.02 | — | — | — | — | 0.01 | — | — | — |
| (13) | 0.03 | 0.28 | — | 17.55 | 0.40 | 0.25 | 0.04 | 0.05 | 0.02 | — | — | — | — | — | — | — | — |
| (14) | 0.50 | 0.21 | — | 17.30 | 2.50 | 0.19 | 0.02 | 0.43 | 0.54 | 0.28 | — | — | — | — | — | — | 0.25 |
| (15) | 1.30 | 0.23 | — | 17.50 | 1.00 | 0.007 | 0.03 | — | 0.04 | — | — | 0.07 | — | — | — | — | 0.05 |
| (16) | 0.45 | 0.22 | — | 17.40 | 0.21 | 0.17 | 0.15 | — | — | 0.02 | — | — | — | — | 0.13 | — | — | 0.01 |
| (17) | 0.06 | 0.24 | — | 17.50 | 1.80 | 0.30 | 0.05 | — | 0.01 | — | — | — | 0.08 | — | — | — | — | — |
| (18) | 0.50 | 0.21 | — | 17.60 | 0.30 | 0.24 | 0.02 | 1.23 | 0.52 | 1.19 | — | — | 0.05 | 0.06 | — | — | — | — |
| (19) | 0.80 | 0.24 | — | 17.50 | 0.50 | 1.72 | 0.03 | — | — | — | — | — | — | — | — | — | — | — |
| (20) | 0.03 | 0.22 | — | 17.55 | 0.03 | 0.25 | 0.04 | 0.02 | — | — | — | — | — | — | — | — | — | — |
| (21) | 0.68 | 0.88 | 11.75 | 19.78 | 0.03 | 0.08 | 0.08 | 0.03 | 0.03 | — | — | — | — | — | — | — | — | 0.01 |
| (22) | 2.30 | 0.54 | — | 17.20 | 0.42 | 0.21 | 0.07 | — | — | — | — | — | — | — | — | — | — | 0.05 |

| Sample | NaF | Nb | V | Zr | S | Total metal fluoride (as F) | Total slag-forming constituents | Total alkali metals | Balance (substantially) | Flux content (%) | Symbol of metal skin | Arc stability | Amount of spatters | Amount of slag | Prevention of slag peeling |
|---|---|---|---|---|---|---|---|---|---|---|---|---|---|---|---|
| 1 | — | — | — | — | — | 0.09 | 0.85 | — | Fe | 20 | a | good | good | good | good |
| 2 | — | — | — | — | — | 0.12 | 0.49 | — | Fe | 20 | c | good | good | good | good |
| 3 | 0.02 | — | — | — | — | 0.01 | 0.16 | 0.013 | Fe | 20 | a | good | excel | good | good |
| 4 | — | — | — | — | 0.019 | 0.045 | 0.27 | — | Fe | 18 | a | excel | good | good | good |
| 5 | — | 0.75 | — | — | — | 0.12 | 0.34 | — | Fe | 20 | a | good | good | good | excel |
| 6 | 0.32 | — | — | — | — | 0.21 | 0.85 | 0.179 | Fe | 25 | a | good | excel | good | good |
| 7 | 0.05 | — | — | — | — | 0.02 | 0.10 | 0.042 | Fe | 20 | a | good | excel | good | good |
| 8 | 0.02 | — | — | — | 0.012 | 0.01 | 0.08 | 0.011 | Fe | 20 | c | excel | excel | good | good |
| 9 | 0.07 | — | — | — | — | 0.032 | 0.08 | 0.038 | Fe | 21 | c | good | excel | good | good |
| 10 | 0.02 | 0.60 | — | — | — | 0.015 | 0.08 | 0.015 | Fe | 20 | b | good | excel | good | excel |
| 11 | — | — | — | — | — | 0.014 | 0.05 | 0.005 | Fe | 20 | b | good | excel | good | good |
| 12 | 0.07 | — | — | — | — | 0.032 | 0.10 | 0.04 | Fe | 20 | b | good | excel | good | good |
| (13) | 0.30 | 0.60 | — | — | — | 0.136 | 0.37 | 0.164 | Fe | 20 | a | good | bad | good | excel |
| (14) | — | — | — | — | 0.018 | 0.183 | 1.50 | 0.067 | Fe | 27 | a | poor | excel | bad | good |
| (15) | — | — | — | — | — | 0.037 | 0.16 | 0.065 | Fe | 18 | a | bad | bad | good | good |
| (16) | 0.01 | — | — | — | — | 0.01 | 0.17 | 0.032 | Fe | 25 | a | bad | bad | good | good |
| (17) | — | — | — | — | 0.019 | — | 0.09 | 0.066 | Fe | 22 | a | poor | bad | good | good |
| (18) | 0.05 | — | — | — | — | 0.023 | 3.10 | 0.082 | Fe | 25 | a | good | excel | bad | good |
| (19) | 0.06 | — | — | — | — | 0.027 | 0.11 | 0.033 | Fe | 23 | a | bad | bad | good | good |
| (20) | 0.30 | — | — | — | — | 0.136 | 0.32 | 0.164 | Fe | 21 | a | bad | bad | good | good |
| (21) | — | — | — | — | — | 0.007 | 0.07 | 0.003 | Fe | 20 | c | bad | excel | good | good |
| (22) | — | — | — | — | — | 0.037 | 0.09 | 0.013 | Fe | 20 | b | good | bad | good | good |

Parenthesized numbers indicate comparative samples.

Table 3 (continued)

Table 3 (continued)

The following are noted from Table 3.

Samples 1 to 12 (pertaining to the present invention) provide stable arcs and give rise to only small amounts of spatters and slag. By contrast, Comparative Sample 13 gives rise to more than 3 g/minute of spatters because of the reduced amount of Si in the wire. Comparative Sample 22 gives rise to a large amount of spatters because of the excess amount of Si. Comparative Sample 14 gives rise to a small amount of spatters because of Si added, but provides unstable arcs due to the excess amount of Ti. Comparative Sample 21 provides unstable arcs because of too small an amount of Ti. Comparative Sample 15, which contains an adequate amount of Si and Ti, provides unstable arcs and gives rise to a large amount of spatters because of too small an amount of Al. Comparative Sample 19 is poor in workability because of an excess amount of Al. Comparative Sample 16 provides unstable arcs because of an excess amount of N. Comparative Sample 17 provides unstable arcs because of too small an amount of metal fluoride. Comparative Sample 18, which contains an adequate amount of Si, Ti, Al, N, and metal fluoride, causes such troubles as pipe clogging with slag because of an excess amount of slag-forming constituents. Comparative Sample 20 provides unstable arcs because of insufficient Si and Ti.

Effect Of The Invention

As mentioned above, the present invention provides a flux-cored wire for welding stainless steel which contains a controlled amount of slag-forming constituents and an adequate amount of Ti, Si, N, Al, and metal fluoride, and hence gives rise to only a small amount of slag and permits easy welding operations. In addition, the wire may contain an adequate amount of Nb, Zr, and V for the prevention of slag peeling, or may contain an adequate amount of alkali metal and S for the improvement of arc stability and arc concentration in welding with a low current and hence for the reduction of spatters.

What is claimed is:

1. A flux-cored wire for welding stainless steel, with the flux filled in a metal skin, which contains 5-30% by weight, of flux, 10.5-27.0% of Cr, less than 2% of slag-forming constituent, 0.05-2.0% of Ti, 0.05-2.0% of Si, 0.01-0.1% of N, 0.01-0.1% of Al, 0.1-1.0% of Mn, and 0.003-0.5% of F constituting the flux, in the total weight of the wire.

2. The flux-cored wire as claimed in claim 1, which further contains up to 25% of Ni, in the total weight of the wire.

3. The flux-cored wire as claimed in claim 1 or 2, which further contains 0.002-0.3% of alkali metals constituting the flux, in the total weight of the wire.

4. The flux-cored wire as claimed in claim 1, which further contains 0.01-0.07% of S, in the total weight of the wire.

5. The flux-cored wire as claimed in claim 1, which further contains 0.01-2.0% in total of Nb, Zr, and V, alone or in combination, in the total weight of the wire.

* * * * *